United States Patent
Yang et al.

(10) Patent No.: US 11,723,026 B2
(45) Date of Patent: Aug. 8, 2023

(54) SYSTEMS AND METHODS FOR MULTI-DIMENSIONAL DIFFERENTIATION OF RADIO ACCESS NETWORKS

(71) Applicant: Verizon Patent and Licensing Inc., Basking Ridge, NJ (US)

(72) Inventors: Jin Yang, Orinda, CA (US); Yuexin Dong, Bridgewater, NJ (US); Xin Wang, Morris Plains, NJ (US); Frank Jager, Chester, NJ (US); Nischal Patel, Hillsborough, NJ (US); Ahmed Moussa, Montclair, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 140 days.

(21) Appl. No.: 17/400,603

(22) Filed: Aug. 12, 2021

(65) Prior Publication Data

US 2023/0051495 A1    Feb. 16, 2023

(51) Int. Cl.
*H04W 72/1273* (2023.01)
*H04W 48/10* (2009.01)
*H04W 48/16* (2009.01)

(52) U.S. Cl.
CPC ....... *H04W 72/1273* (2013.01); *H04W 48/10* (2013.01); *H04W 48/16* (2013.01)

(58) Field of Classification Search
CPC .. H04W 72/1273; H04W 48/10; H04W 48/16
See application file for complete search history.

(56) References Cited

U.S. PATENT DOCUMENTS

2013/0021932 A1*  1/2013  Damnjanovic ... H04W 52/0209
370/252

\* cited by examiner

*Primary Examiner* — Diane D Mizrahi

(57) ABSTRACT

A device may receive information from a unified database, wherein the information includes a Service Profile Identifier (SPID); select a Quality-of-Service (QoS)-related identifier (ID) at least based on the SPID; and either map a radio bearer to a flow associated with a User Equipment device (UE) or configure a component to map the radio bearer to the flow. After mapping the radio bearer to the flow, the device may send data from the flow to the UE based on the QoS related ID. After configuring the component, the device may forward the SPID to a second component for sending the data from the flow to the UE based on the QoS-related ID.

20 Claims, 13 Drawing Sheets

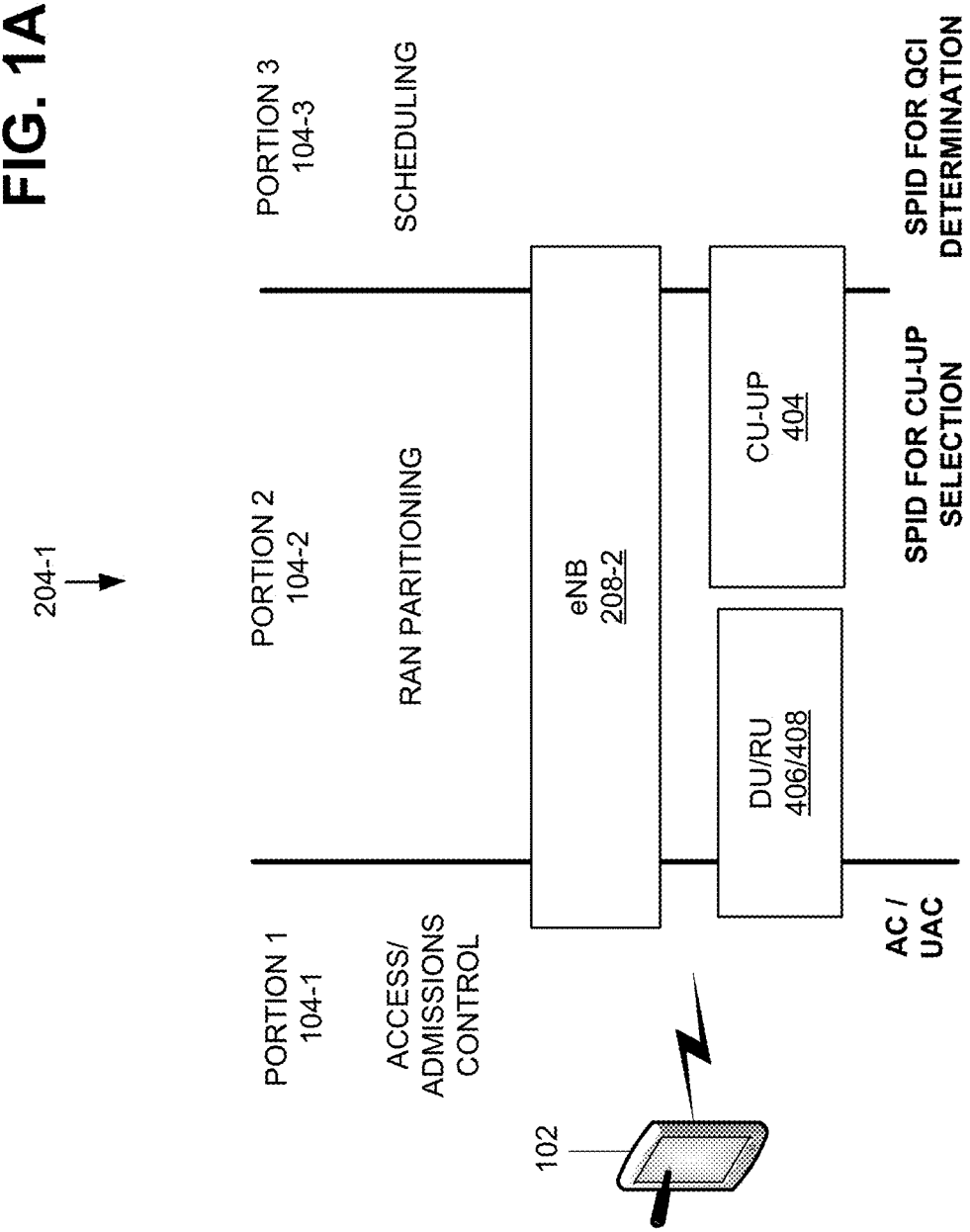

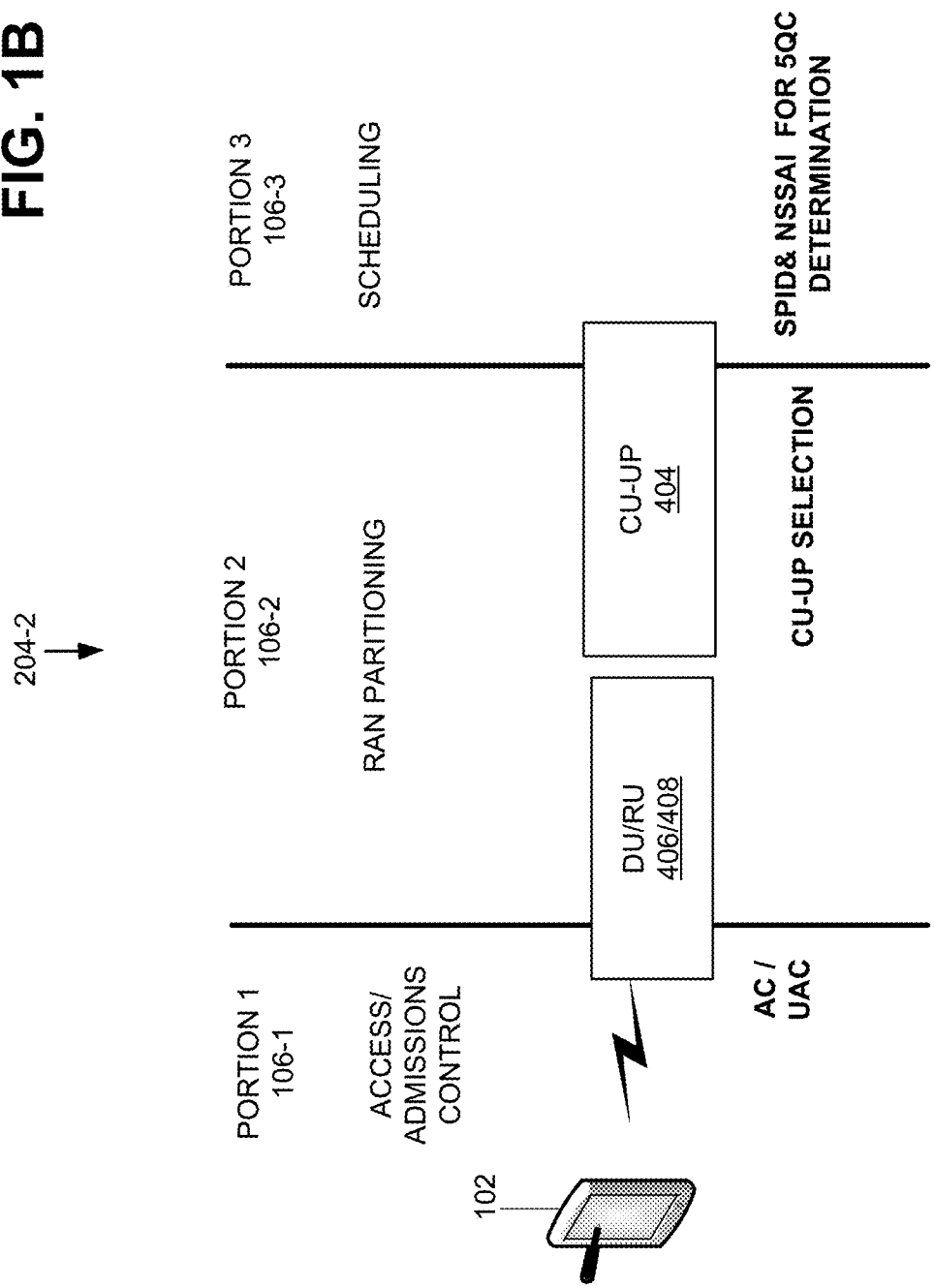

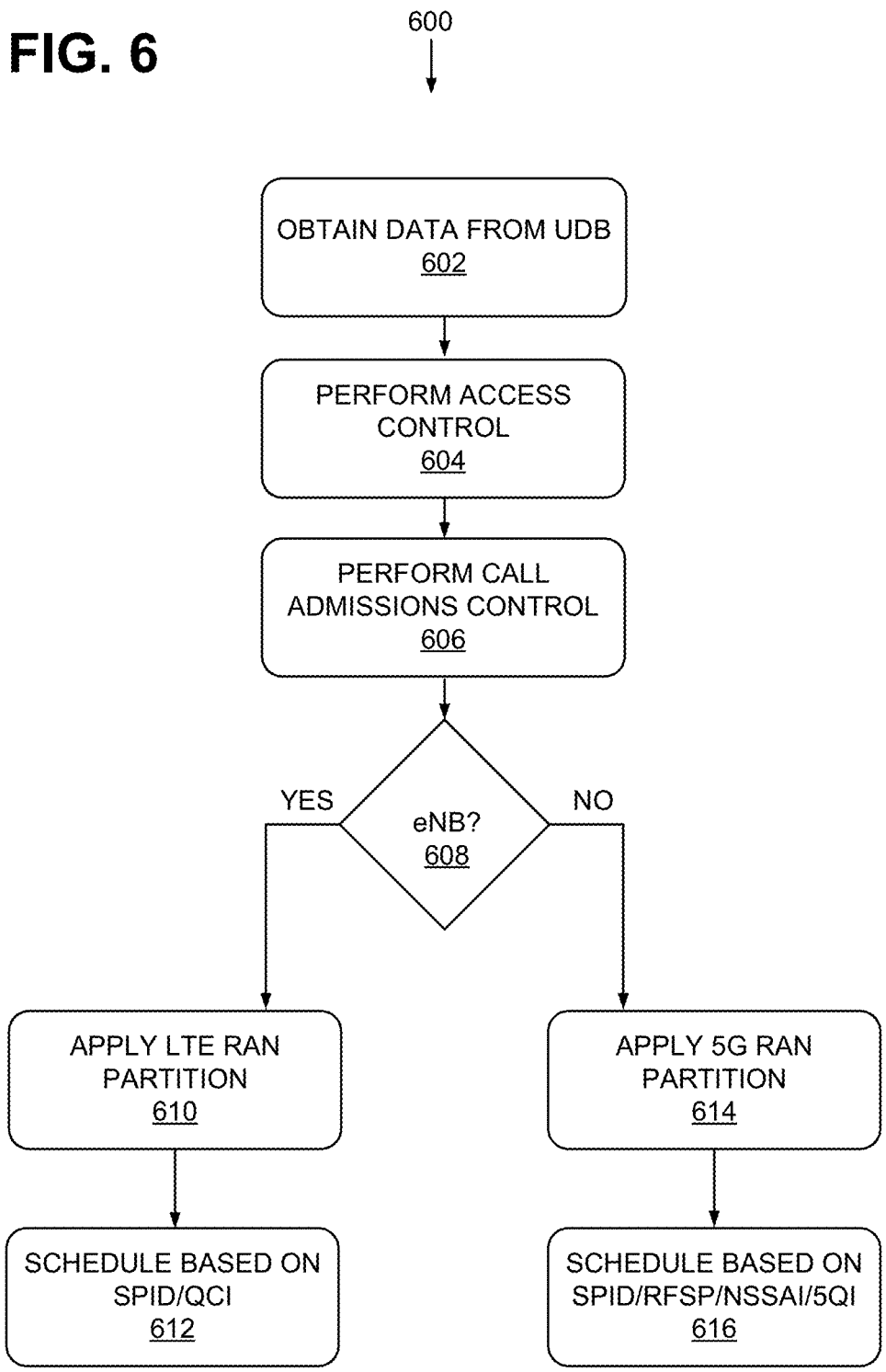

FIG. 9A

| SPID VALUE | SPID DESCRIPTION | QCI | QCI DESCRIPTION |
|---|---|---|---|
| SPID_MEC | MOBILITY TO REDUCE SPIKES | QCI_A | LATENCY < 30 MS CORE |
| SPID_FWA | MOBILITY FOR COVERAGE/RATE | QCI_B | LATENCY < 20 MS CORE |
| SPID_EMBB | BEST EFFORT THROUGHPUT | QCI_C | |
| ... | ... | ... | ... |

900

SYSTEMS AND METHODS FOR MULTI-DIMENSIONAL DIFFERENTIATION OF RADIO ACCESS NETWORKS

BACKGROUND INFORMATION

Advanced wireless radio networks, such as Fifth Generation (5G) radio access networks (NG-RANs), may incorporate many new wireless technologies. For example, a 5G network may allow the functions of a wireless station in the NG-RAN to be split into its constituent functional components: a Central Unit-Control Plane (CU-CP), a Central Unit User Plane (CU-UP), Distributed Units (DUs), and/or Radio Units (RUs). Such a split is aimed to increase flexibility in network design and to allow scalable and cost-effective network deployments. By splitting the functions of a wireless station, it is possible to tune particular performance parameters that depend on applications (e.g., gaming application, Voice-over-IP (VoIP) application, video streaming application, etc.) with different latency requirements. The performance parameters may be tuned based on the locations of the devices receiving the service, and/or on other variables.

BRIEF DESCRIPTION OF THE DRAWINGS

FIGS. 1A-1B illustrate concepts described herein;

FIG. 6 is a flow diagram of an example process that is associated with 5G differentiated Radio Access Network (RAN) services according to an implementation;

FIG. 9A illustrates example table of Service Profile Identifiers (SPIDs) for an NSA 5G RAN according to an implementation;

DETAILED DESCRIPTION OF EXAMPLE EMBODIMENTS

Figure 2:
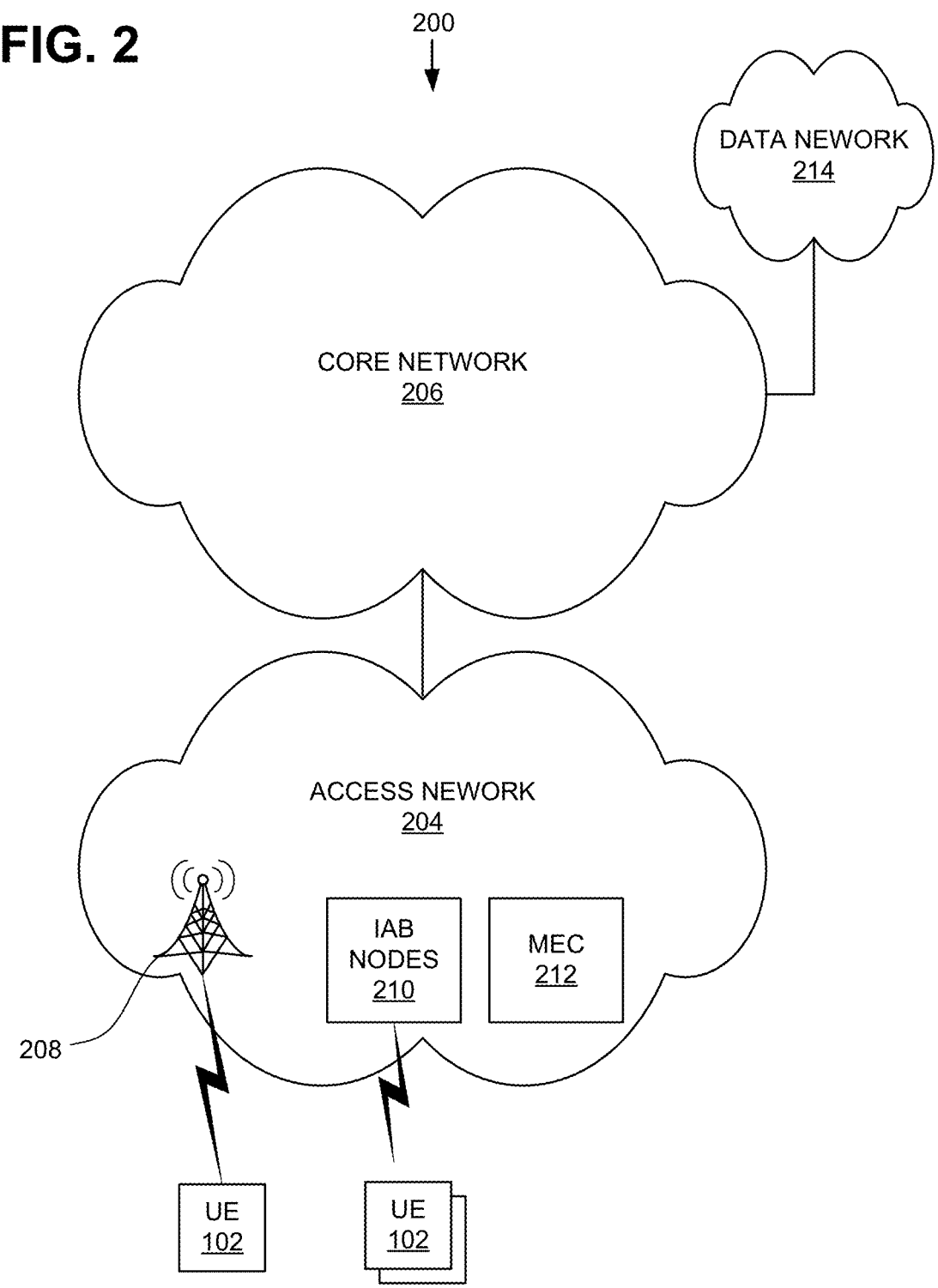
FIG. 2 illustrates an example network environment in which the systems and methods described herein may be implemented.

The following detailed description refers to the accompanying drawings. The same reference numbers in different drawings may identify the same or similar elements.

The systems and methods described herein relate to differentiation of Fifth Generation (5G) Radio Access Networks (RANs) (e.g., New Radio Access Networks (NR-RANs)) and/or Long-Tern Evolution (LTE) RANs. In particular, the systems and the methods described herein relate to applying Service Profile Identifiers (SPIDs), Single-Network Slice Selection Assistance Information (S-NSSAIs), Access Control (AC) parameters, and/or Call Admission Control (CAC) parameters. The system may use an integrated AC and CAC database for access control and call admission control; and use SPIDs and S-NSSAIs for assigning Quality-of-Service Class Identifiers (QCIs) and 5G QoS Identifiers (5QIs). In addition, the system may apply QCIs and/or 5QIs for scheduling data in the RANs. The system may perform all these functions, within the same wireless network, for 5G Standalone (SA) networks and/or Non-Standalone (NSA) networks. As used herein, the term SA network may refer to an entirely 5G network, and the term NSA network may refer to a network (e.g., 4G/LTE network) that includes 5G RAN components (e.g., 5G base station (gNB), gNB subcomponents such as Central Unit-Control Planes (CU-CPs), CU-User Planes (CU-UPs), Distributed Units (DUs), and/or Radio Units (RUs)). In an NSA network, the 5G RAN components and/or subcomponents may be anchored on LTE components, such as LTE core components and/or LTE base stations (eNB).

FIG. 1A illustrates the concepts described herein, as applied to an NSA network. The NSA network may be a portion of a wireless network, such as a Public Land Mobile Network (PLMN). As shown, a User Equipment device (UE) 102 connects to the NSA network that includes a RAN 204-1. RAN 204-1 may comprise three different portions: portion 104-1, portion 104-2, and portion 104-3. In the NSA, all portions 104 are implemented by eNB 208-2 and/or 5G RAN components DU/RU 406/408 and CU-UP 404. These components are described below greater detail.

In portion 104-1, if UE 102 connects to eNB 208-2, eNB 208-2 may apply or enforce access control (AC) and/or UE admission control (UAC). If UE 102 connects to DU 406 via RU 408, DU 406 may enforce the AC and/or UAC. The signals for causing DU 406 to enforce the AC/UAC are received by DU 406 from a CU-CP (not shown).

Portion 104-2 of RAN 204-2 comprises non-5G components (e.g., eNB 208-2) and 5G RAN components (i.e., DU/RU 406/408 and CU-UP 404). If UE 102 connects to RAN 204-1 via DU/RU 406/408, the data from UE 102 may be directed to a particular CU-UP 404. The selection of a particular CU-UP 404 and thus the partitioning of the RAN 104-2 into various DU/RU 406/408 and CU-UP 404, may be performed upstream, at a CU-CP (not shown) based on a Service Profile Identifier (SPID). The CU-CP may also provide the SPID associated with UE 102 to DU 406 for scheduling downlink data transmission.

In one implementation, a SPID may be a number assigned by a telecommunication service provider (e.g., a phone company). A SPID may indicate the capabilities of UE 102 associated with the SPID. In one implementation, a SPID may span 14 digits that include 10 digits corresponding to a telephone number.

In portion 104-3, depending on whether UE 102 attaches to RAN 204-2 via eNB 208-2 or CU-UP 404, either eNB 208-2 or the CU-CP may determine the QCI corresponding to the SPID for UE 102 and forward the QCI to CU-UP 404. CU-UP 404 may select or associate the radio bearer of UE 102 with a flow/stream. Thereafter, data from UE 102 to DU 406 over the radio bearer would be conveyed over the stream/flow to their destination.

FIG. 1B illustrates the concepts described herein, as applied to a SA network. Like an NSA network, the SA network may also be a portion of a wireless network, such as a PLMN. As shown, a UE 102 connects to the SA network that includes a RAN 204-2. RAN 204-2 may comprise three different portions: portion 106-1, portion 106-2, and portion 106-3. In the SA network, portions 106 are implemented by 5G RAN components DU/RU 406/408 and CU-UP 404.

In portion 106-1, when UE 102 connects to DU/RU 406/408, DU/RU 406/408 may apply or enforces access control and/or UE call admission control. DU 406 may enforce the AC and/or UAC. The signals for causing DU 406 to enforce the AC/UAC are received by DU 406 from CU-CP (not shown). A CU-CP, for example, may instruct DU/RU 406/408 to bar access to network for UEs 102 that attempt to access particular network slices (described below).

Portion 106-2 in RAN 204-2 comprises 5G RAN components (i.e., DU/RU 406/408 and CU-UP 404). If UE 102 is connected to RAN 204-2 via DU/RU 406/408, the data from UE 102 may be directed to a particular CU-UP 404. The selection of a particular CU-UP 404 and thus the RAN partitioning into various DU/RU 406/408 and CU-UP 404 may be performed upstream, at a CU-CP (not shown) based on a SPID and/or S-NSSAI. The CU-CP may obtain the SPID associated with UE 102 from another network component and obtain S-NSSAI from UE 102, to select the CU-UP 404 for UE 102.

In portion 106-3, CU-UP 404 may associate the radio bearer of UE 102 with a flow/stream that has the same 5QI. Accordingly, data from UE 102 over the radio bearer would be conveyed to their destination via the stream/flow.

In both FIGS. 1A and 1B, various components of RAN 204-1 and/or RAN 204-2 and other wireless network components use SPIDs, S-NSSAIs, AC parameters, and/or CAC parameters. The components may obtain AC and CAC parameters from an integrated AC and CAC database (not shown) for access control and call admission control; use SPIDs and S-NSSAIs for assigning QCI and 5QI. In addition, the components may apply QCI and/or 5QI for scheduling data in the RANs. The components may perform all these functions, within the same wireless network, for 5G NSA networks and/or SA networks.

FIG. 2 illustrates an example network environment 200 in which the systems and methods described herein may be implemented. As shown, environment 200 may include UEs 102 (individually referred to as UE 102), an access network 204, a core network 206, and a data network 214. UE 102 may include a wireless communication device, a mobile terminal, or a fixed wireless access (FWA) device. Examples of UE 102 include: a smart phone; a tablet device; a wearable computer device (e.g., a smart watch); a laptop computer; an autonomous vehicle with communication capabilities; a portable gaming system; and an Internet-of-Thing (IoT) device.

In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets to or over access network 204. UE 102 may have the capability to select a particular network slice from which UE 102 can request a service. UE 102 may have the capability to connect to different Radio Access Technology (RAT) access devices, such as LTE or 5G base stations.

Access network 204 may allow UE 102 to access core network 206. To do so, access network 204 may establish and maintain, with participation from UE 102, an over-the-air channel with UE 102; and maintain backhaul channels with core network 206. Access network 204 may convey information through these channels, from UE 102 to core network 206 and vice versa.

Access network 204 may include an LTE radio network, a 5G radio network and/or another advanced radio network. These radio networks may operate in many different frequency ranges, including millimeter wave (mmWave) frequencies, sub 6 GHz frequencies, and/or other frequencies. Access network 204 may include many wireless stations, CUs and DU (described below with reference to FIG. 4) and devices herein referred to as Integrated Access and Backhaul (IAB) nodes. In FIG. 2, these are depicted as a wireless station 208 and IAB nodes 210. Wireless station 208 and IAB nodes 210 may establish and maintain an over-the-air channel with UEs 102 and backhaul channels with core network 206.

Wireless station 208 may include a LTE, 5G, or another type of wireless station (e.g., evolved Node B (eNB), next generation Node B (gNB), etc.) that includes one or more Radio Frequency (RF) transceivers. A wireless station 208 that is attached to an IAB node via a backhaul link is herein referred to as IAB donor 208. As used herein, the term "IAB donor" refers to a specific type of IAB node. IAB donor 208 may have the capability to act as a router. IAB nodes 210 may include one or more devices to relay signals from an IAB donor to UE 102 and from UE 102 to IAB donor 208. An IAB node 210 may have an access link with UE 102 and have a wireless and/or wireline backhaul link to other IAB nodes 210 and/or IAB donor 208. An IAB node 210 may have the capability to operate as a router for other IAB nodes 210, for exchanging routing information with IAB donor 208 and other IAB nodes 210 and for selecting traffic paths.

As further shown, access network 204 may include a Multi-Access Edge Computing (MEC) cluster 212. MEC cluster 212 may be located geographically close to wireless stations, and therefore also be close to UEs 102 serviced by the wireless station. Due to its proximity to UEs 102, MEC cluster 212 may be capable of providing services to UEs 102 with minimal latency. Depending on the implementations, MEC cluster 212 may provide many core network functions at network edges. In other implementations, MEC cluster 212 may be positioned at other locations (e.g., in core network 206) at which MEC cluster 212 can provide computational resources for improved performance.

Core network 206 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, a PLMN, or a combination of networks. Core network 206 may allow the delivery of Internet Protocol (IP) services to UE 102, and may interface with other networks, such as data network 214.

Depending on the implementation, core network 206 may include 4G core network components (e.g., a Serving Gateway (SGW), a Packet data network Gateway (PGW), a Mobility Management Entity (MME), etc.), 5G core network components (e.g., a User Plane Function (UPF), an Application Function (AF), an Access and Mobility Function (AMF), a Session Management Function (SMF), a Unified Data Management (UDM) function, a Network Slice Selection Function (NSSF), a Policy Control Function (PCF), etc.), or another type of core network components.

Data network 214 may include networks that are external to core network 206. In some implementations, data network 214 may include packet data networks, such as an Internet Protocol (IP) network.

Although not shown, access network 204, core network 206, and data network 214 may be configured to provide network slicing. Advanced wireless networks, such as a 5G network, may rely on network slicing to increase network efficiency and performance. Network slicing involves a form of virtual network architecture that enables multiple logical networks to be implemented on top of a shared physical network infrastructure using software defined networking (SDN) and/or network function virtualization (NFV). Each logical network, referred to as a "network slice" instance, may encompass an end-to-end virtual network with dedicated storage and/or computational resources that include access network components, clouds, transport, Central Processing Unit (CPU) cycles, memory, etc. Furthermore, each network slice instance may be configured to meet a different set of requirements and be associated with a particular QoS, a type of service, and/or a particular group of enterprise customers associated with mobile communication devices and/or fixed wireless access (FWA) devices.

Each network slice instance may be associated with an identifier, herein referred to as an S-NSSAI and a network slice instance ID. Each instance of a network slice with a particular S-NSSAI may have the same S-NSSAI but different network slice instance ID (NSI). UE 102 may connect to a particular application in a particular network slice.

For clarity, FIG. 2 does not show all components that may be included in network environment 200 (e.g., routers, bridges, wireless access point, additional networks, additional UEs 102, wireless station 208, IAB nodes 210, MEC clusters 212, etc.). Depending on the implementation, network environment 200 may include additional, fewer, different, or a different arrangement of components than those illustrated in FIG. 2. Furthermore, in different implementations, the configuration of network environment 200 may be different. For example, wireless station 208 may not be linked to IAB nodes 210 and may operate in frequency ranges (e.g., sub-6 GHz) different from or same as those used by IAB nodes 210 (e.g., mmWave or another frequency range).

Figure 3A:
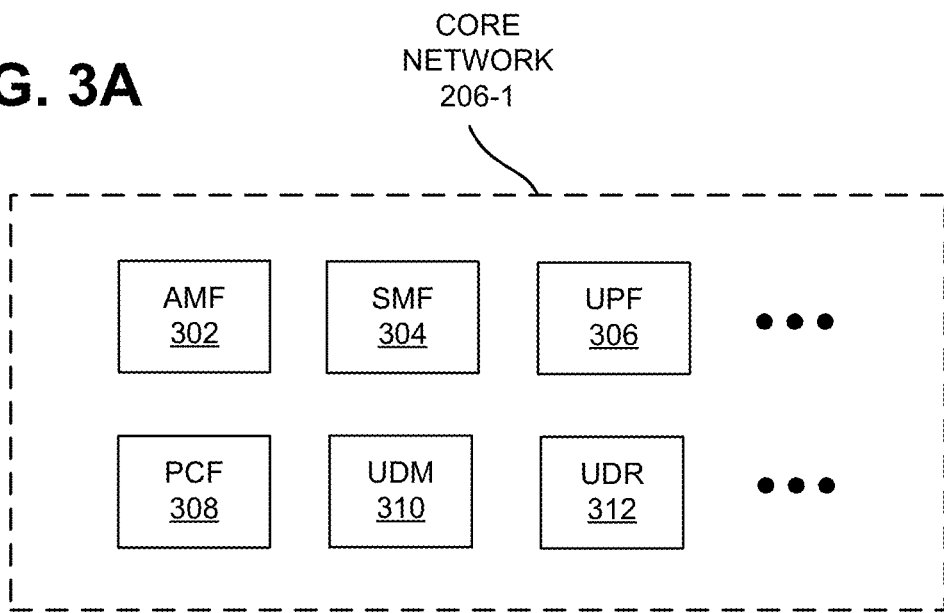
FIGS. 3A and 3B illustrate example functional components of a core network according to different implementations.

FIG. 3A illustrates example functional components of core network 206 when it is implemented as a 5G core network 206-1. In some implementations, core network 206 may be implemented not solely as core network 206-1, but as another type of core network (e.g., LTE/4G core network 206-2 shown in FIG. 3B) or a combination of different types of core networks. As shown, 5G core network 206-1 may include core components such as Access and Mobility Function (AMF) 302, a Session Management Function (SMF) 304, a User Plane Function (UPF) 306, a Policy Control Function (PCF) 308, a Unified Data Management 310, and a Unified Data Repository (UDR) 312. Depending on the implementation, core network 206-1 may include additional, fewer, or different core components than those illustrated in FIG. 3A. Furthermore, depending on the implementation, through network slicing and network virtualization, core components 302-312 and other core components may be implemented in a data center or MEC cluster 212 in access network 204 or in data network 214. In such implementations, the core components may be integrated into networks other than core network 206-1.

AMF 302 may perform registration management, connection management, reachability management, mobility management, lawful intercepts, Short Message Service (SMS) transport between UE 102 and an SMS function (not shown), session management message transport between UE 102 and SMF 304, access authentication and authorization, location services management, management of non-3GPP access networks, and/or other types of management processes.

SMF 304 may perform session establishment, modification, and/or release, perform IP address allocation and management, perform Dynamic Host Configuration Protocol (DHCP) functions, perform selection and control of UPF 306, configure traffic steering at UPF 306 to guide traffic to the correct destination, terminate interfaces toward PCF 308, perform lawful intercepts, charge data collection, support charging interfaces, terminate session management of Non-Access Stratum (NAS) messages, perform downlink data notification, manage roaming functionality, and/or perform other types of control plane functions for managing user plane data.

UPF 306 may maintain an anchor point for intra/inter-Radio Access Technology (RAT) mobility, maintain an external protocol data unit (PDU) point of interconnect to a data network (e.g., data network 214), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, send and forward an "end marker" to a radio access network node (e.g., gNB), and/or perform other types of user plane processes.

PCF 308 may support policies to control network behavior, provide policy rules to control plane functions (e.g., to SMF 304), access subscription information relevant to policy decisions, perform policy decisions, and/or perform other types of processes associated with policy enforcement. In some implementations, PCF 308 may include a rule for a node to redirect UE 102-originated IP traffic to a selected endpoint.

UDM 310 may maintain subscription information for UEs 102, manage subscriptions, handle user identification, perform access authorization based on subscription data, perform network function registration or subscription management, maintain service and/or session continuity by maintaining assignment of SMF 304 for ongoing sessions, support SMS message delivery, support lawful intercept functionality, and/or perform other processes associated with managing user data. UDR 312 may serve as a repository for the data that UDM 310 manages, such as user profiles.

Figure 3B:
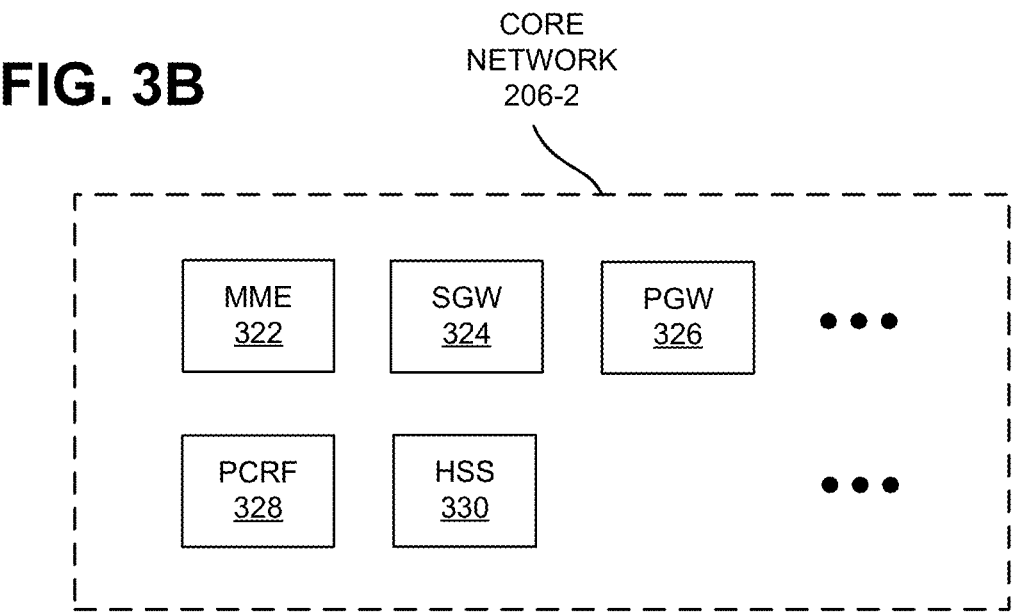

FIG. 3B illustrates example functional components of core network 206 when it is implemented as an LTE core network 206-2. In some implementations, core network 206 may be implemented not only as an LTE/4G core network 206-2, but also as 5G core network 206-1 or a combination of different types of core networks. As shown, LTE core network 206-2 may include Evolved Packet Core (EPC) components, such as a Mobility Management Entity (MME) 322, a Serving Gateway (SGW) 324, a Packet data network Gateway (PGW) 326, a Policy and Charging Rules Function (PCRF) 328, and Home Subscriber Server (HSS) 330. The functions of these components 322-328 roughly correspond to and are similar to those of the functions of components 302-308, but in the context of LTE core network. HSS 330 may roughly correspond to the functions of UDM 310 and UDR 312.

Figure 4:
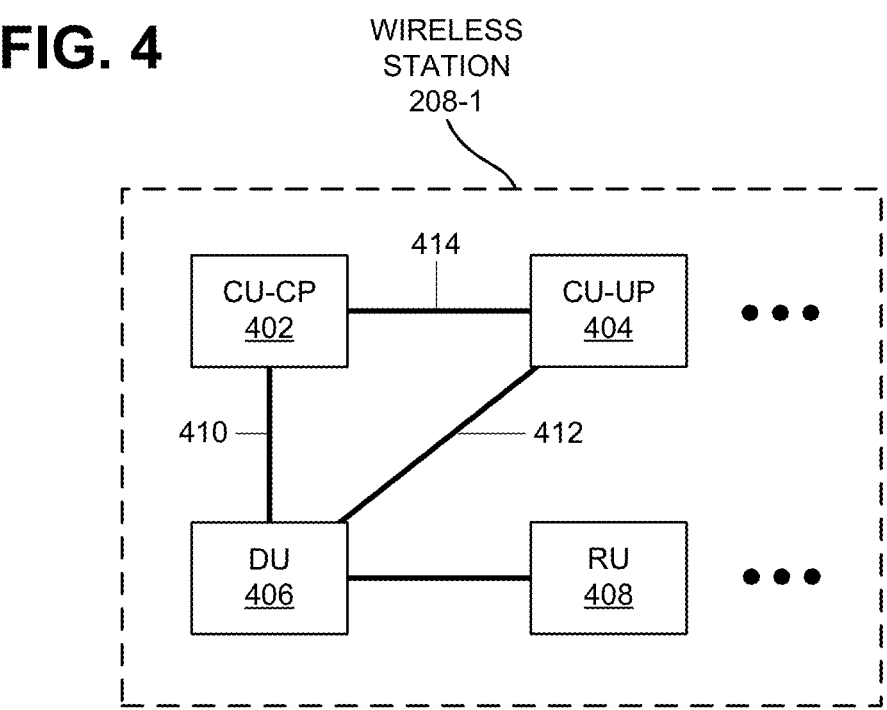
FIG. 4 illustrates an example functional components of a wireless station, according to an implementation.

FIG. 4 illustrates an example logical components 402-408 of a wireless station 208 when wireless station is implemented as a 5G wireless station (gNB) 208-1. As shown, wireless station 208-1 may include a Central Unit-Control Plane (CU-CP) 402, a Control Unit-User Plane (CU-UP) 404, a Distributed Unit (DU) 406, and a Radio Unit (RU) 408. Depending on the implementation, the logical components of wireless station 208 may comprise additional, fewer, and/or different components than those illustrated in FIG. 4. For example, wireless station 208-1 may include multiple DUs 406 and RUs 408. Furthermore, although components 402-408 are depicted as being included in wireless station 208-1, each of components 402-408 may be implemented in access network 204 without being confined to a specific wireless station 208-1. Furthermore, CU-CP 402 and CU-UP 404 may be implemented in MEC cluster 212 or in a data center as part of a network slice through network function virtualization.

CU-CP 402 may perform control plane signaling associated with managing DU 406 over F1-C interface 410. CU-CP 402 may signal to DU 406 over a control plane communication protocol stack that includes, for example, F1AP (e.g., the signaling protocol for F1 interface between a CU and a DU). CU-CP 402 may include protocol layers comprising: Radio Resource Control (RRC) layer and a Packet Data Convergence Protocol-Control Plane (PDCP-C). DU 406 may include corresponding stacks to handle/respond to the signaling (not shown).

CU-UP 404 may perform user plane functions associated with managing DU 406 over F1-U interface 412. CU-UP 404 may interact with DU 406 over a user plane communication protocol stack that includes, for example, General Packet Radio Service Tunneling Protocol (GTP)-User plane, the User Datagram Protocol (UDP), and the IP. DU 406 would have corresponding layers to handle/respond to messages from CU-UP 404 (not shown). CP-UP 404 may include processing layers that comprise a Service Data Adaptation Protocol (SDAP) and a PDCP-User Plane (PDCP-U). CU-UP 404 and CU-CP 402 communicate over E1 interface 414, for example, for exchanging bearer setup messages.

Although CU-CP 402 and CU-UP 404 (collectively referred to as CU) and DU 406 are illustrated as part of wireless station 208, the CU-CP 402, CU-UP 404, and DU 406 do not need to be physically located close to one another, as CU-CP 402 and CU-UP 404 may be implemented as cloud computing elements, through network function virtualization capabilities of the cloud. A CU may communicate with the components of core network 206 through S1/NG interfaces and with other CUs through X2/Xn interfaces.

DU 406 may provide support for one or more cells covered by radio beams at the RU 408. DU 406 may handle UE mobility, from a DU to a DU, gNB to gNB, cell to cell, beam to beam, etc. RU 408 may perform physical layer functions, such as antenna functions, transmissions of radio beams, etc.

Figure 5A:
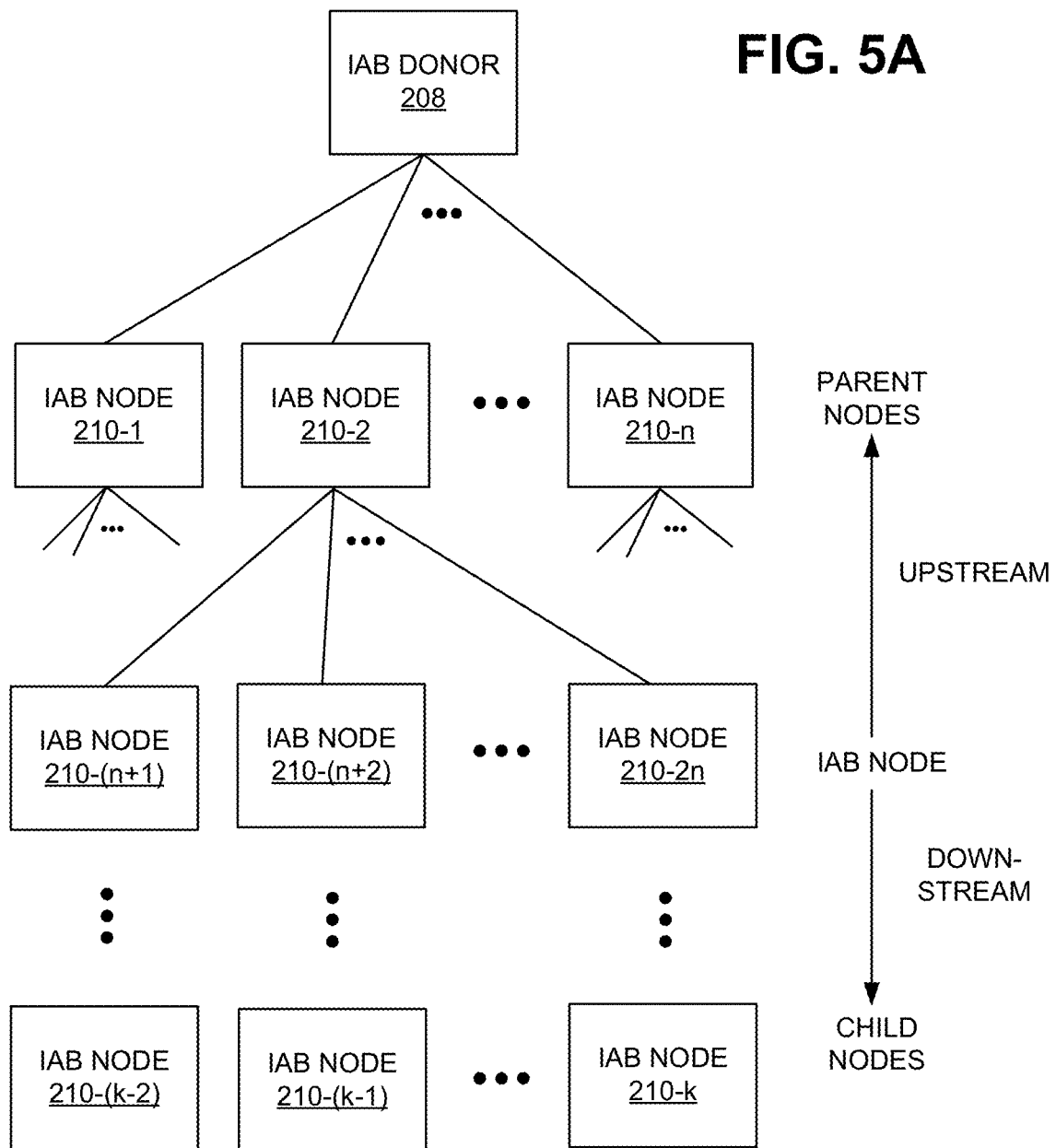
FIG. 5A illustrates an example network layout of Integrated Access and Backhaul (IAB) nodes according to an implementation.

FIG. 5A illustrates an example network layout of IAB nodes 210. As shown, some IAB nodes 210 may be attached to wireless station 208 (e.g., gNB), otherwise referred to as IAB donor 208 and to other IAB nodes 210 through backhaul links. Each IAB node 210 may have a parent node upstream (e.g., either a parent IAB node 210 or IAB donor 208) and a child node downstream (e.g., either a UE 102 or a child IAB node 210). An IAB node 210 that has no child IAB node 210 is herein referred to as a leaf IAB node 210. UE 102 may establish an access link with any of IAB nodes 210 and not just leaf IAB nodes 210.

Figure 5B:
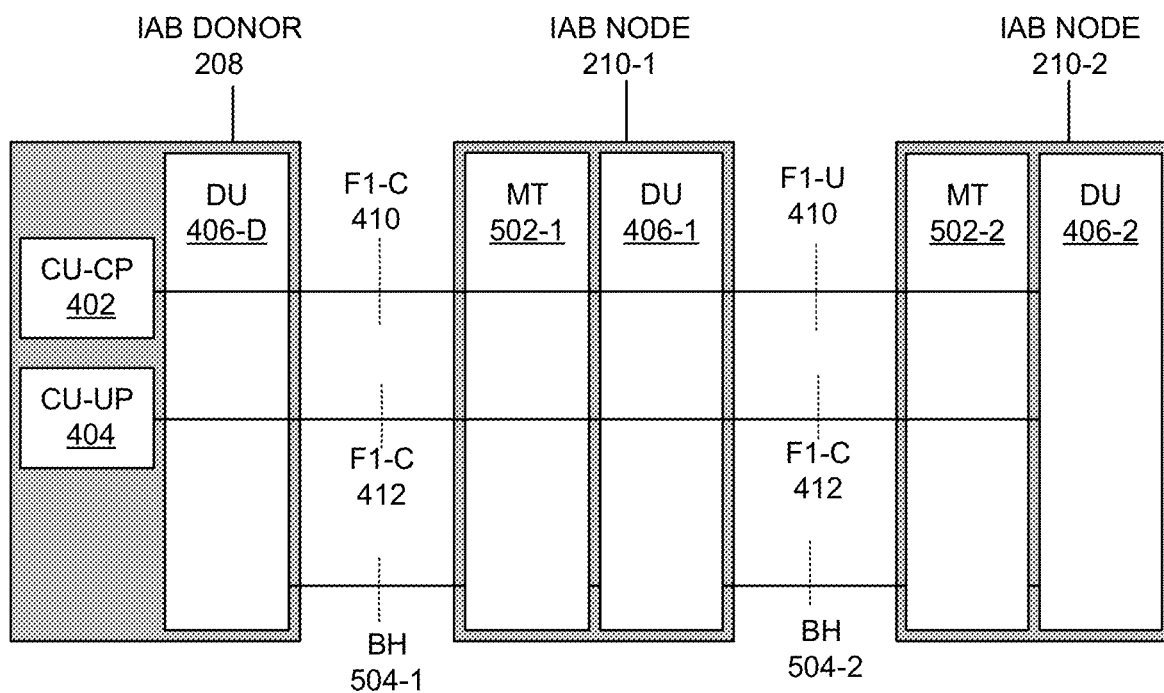
FIG. 5B illustrates example functional components of IAB nodes and an IAB donor according to an implementation.

FIG. 5B illustrates example functional components of IAB donor 208 and IAB nodes 210 in FIGS. 2 and 5A. In FIG. 5B, although only a single IAB node 210-1 is shown to be between IAB node 210-2 and IAB donor 208, in other embodiments, there may be many IAB nodes 210 between an IAB node 210-2 and IAB donor 208. Furthermore, although, FIG. 5B shows only a single path from IAB node 210-2 to IAB donor 208, there may be one or more paths from IAB node 210-2 to IAB donor 208. As shown, IAB donor 208 includes CU-CP 402, CU-UP 404, and DU 406-D; IAB node 210-1 includes mobile terminal (MT) 502-1 and DU 406-1; and IAB node 210-2 includes MT 502-2 and DU 406-2.

In FIG. 5B, the control plane connections from CU-CP 402 and CU-UP 404 in IAB donor/wireless station 208 are shown as terminating at DU 406-2 in IAB node 114-2. However, for the path between IAB donor 208 and IAB node 210-1, CU-CP 402 and CU-UP 404 would terminate their connections at DU 406-1 in IAB node 210-1, although not shown in FIG. 5B.

Each of MTs 502-1 and 502-2 permits its host device to act like a mobile terminal (e.g., UE 102). For example, to DU 406-D in IAB donor 208, MT 502-1 in IAB node 210-1 behaves similarly as a mobile terminal wirelessly attached to DU 406-D. The relationship between MT 502-1 and DU 406-D, and between MT 502-2 and DU 406-1, is established over a Backhaul (BH) channel 504-1 between DU 406-D of IAB donor 208 and MT 502-1 of IAB node 210-1 and over BH channel 504-2 between DU 406-1 of IAB node 210-1 and MT 502-2 of IAB node 210-2.

Each of BH channels 504-1 and 504-2 in FIG. 5B includes multiple network layers that comprise, for example, a Backhaul Adaptation Layer (BAP), a Radio Link Control (RLC), a Media Access Control (MAC), and a Physical layer (PHY. These layers are not illustrated in FIG. 5B.

As BH channels may be RF channels, IAB nodes 210 may be part of access network 204 through wireless connections and therefore do not need to be interconnected through cables or optical fibers. In contrast to other wireless stations that are bound to access network 204 through cables or optical fibers, IAB nodes 210 may be placed in locations where cables or fibers are difficult to lay, and therefore, may easily provide access points for UEs 102. If necessary, IAB nodes 210 may be moved from one geographical location to another without re-cabling, as communication demands at different locations change.

Figure 7:
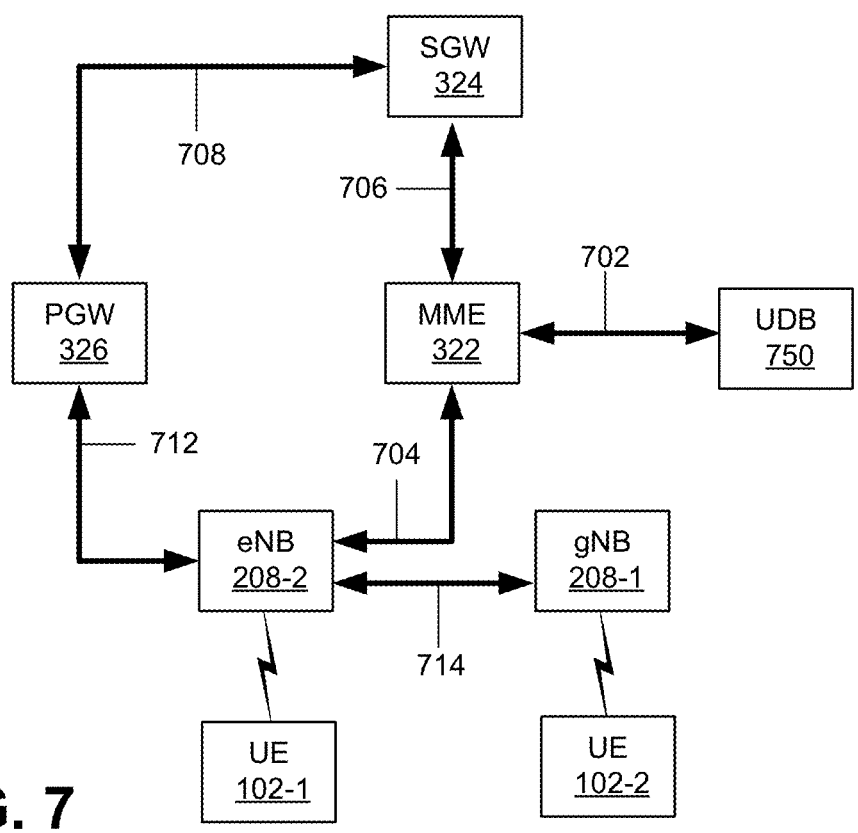
FIG. 7 is a diagram illustrating example signal paths and data paths between example network components when providing differentiated non-standalone (NSA) 5G RAN services, according to an implementation.
Figure 8:
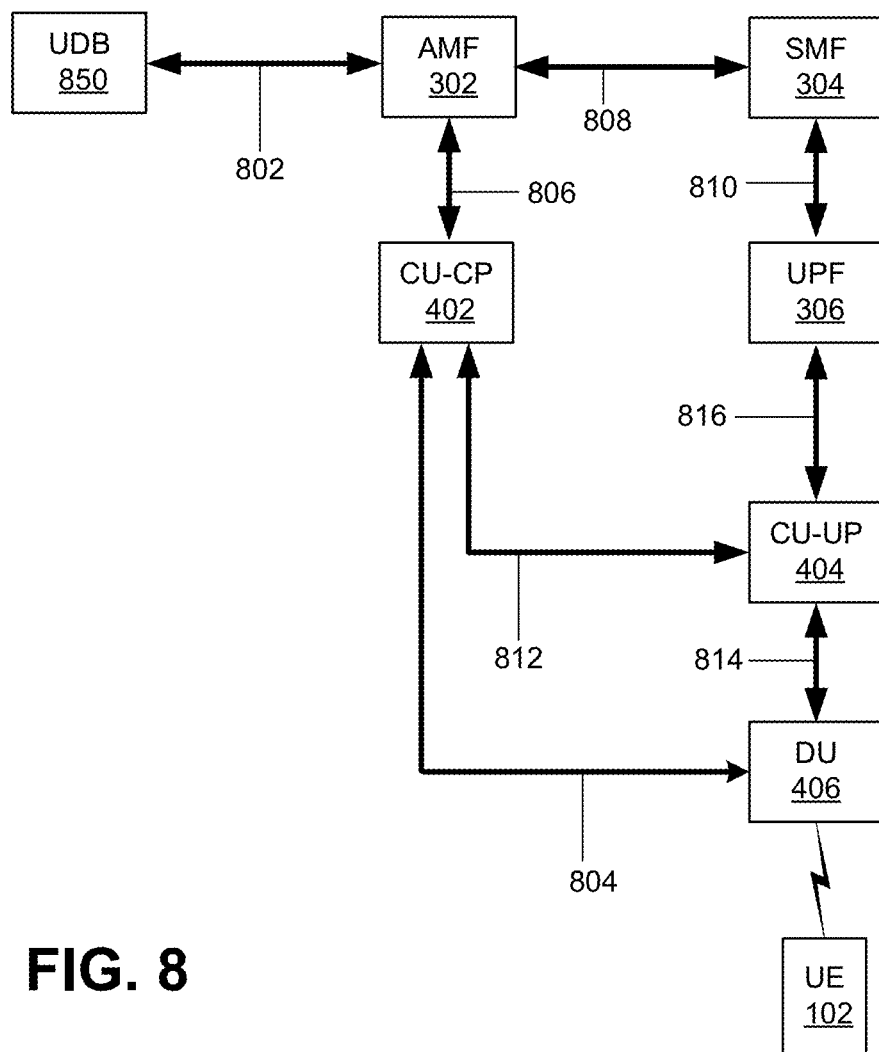
FIG. 8 is a diagram illustrating example signal paths and data paths between example network components when providing differentiated standalone (SA) 5G RAN services, according to an implementation.

FIG. 6 is a flow diagram of an example process 600 that is associated with differentiated 5G RAN services according to an implementation. Below, process 600 is described along with reference to FIGS. 7 and 8. FIG. 7 is a diagram illustrating example signal paths and data paths between example network components, of the system described herein, when providing differentiated SA 5G RAN services. Although not shown, UE 102-2 may attach not only directly to gNB 208-1, but through an IAB node 210 that is one or more hops away from gNB 208-1 (see FIG. 5A). FIG. 8 is a diagram illustrating example signal paths and data paths between example network components, of the system described herein, when providing differentiated NSA 5G RAN services. Although not shown, DU 406 may be part of an IAB node 210 that is one or more hops from CU-CP 402 (see FIG. 5A).

Process 600 may be performed by one or more of the components shown in FIGS. 7 and 8. As shown, process 600 may include obtaining information about AC or CAC from a Unified Database (UDB) (block 602). For example, in FIG. 7, eNB 208-2 may receive AC/CAC information from UDB 750 over paths 702 and 704, and gNB 208-1 may receive the same information via eNB 208-2. In one embodiment, UDB 750 may be implemented by HSS 330. In another example, in FIG. 8, CU-CP 402 may receive AC/CAC information from UDB 850 over path 802 and 806. In one embodiment, UDB 850 may be implemented by UDM 310.

Process 600 may include performing access control (block 604). For example, in FIG. 7, eNB 208-2 and/or gNB 208-1 may broadcast signals for access barring. UEs 102 that meet the conditions specified in the access barring signals may refrain from attaching to eNB 208-2 and/or gNB 208-1. In another example, in FIG. 8, CU-CP 402 may instruct DUs 406 to broadcast access barring signals via RU 408 (not shown in FIG. 8). In response to the instruction from CU-CP 402, DU 406 may broadcast access barring signals to UEs 102. UEs 102 that meet the conditions specified in the access barring signals may refrain from attaching to DU 406 (e.g., UE 102 which to access particular network slices may be barred).

Process 600 may further include performing call admission control (block 606). With reference to FIG. 7, continuing with the preceding example, assumed that eNB 208-2 or gNB 208-1 is accessible to UE 102-1 or 102-2. UE 102-1 or UE 102-2 may attempt to establish a link with eNB 208-2 or gNB 208-1 and register with core network 206. During the attempt, eNB 208-2 or gNB 208-1 may determine whether the connection is admissible based on the current bandwidth use, the number of connections eNB 208-2 or gNB 208-1 has with other UEs 102, etc. In some implementations, eNB 208-2 or gNB 208-1 may have received the thresholds for determining the call admissions from UDB 750 (e.g., at block 602). If permitting UE 102-1 or 102-2 to connect to gNB 208-1 or eNB 208-2 would cause eNB 208-2 or gNB 208-1 to exceed the bandwidth use threshold or the threshold number of connections to other UEs 102, etc., gNB 208-1/eNB 2080-2 would not allow UE 102-2 or 102-1 to establish a Radio Resource Control (RRC) connection with gNB 208-1 or eNB 208-2 and register with core network 206. Similarly, in FIG. 8, continuing with the preceding example, assume that DU 406 is accessible to UE 102, UE 102 may attempt to establish a link with DU 406. During the attempt, DU 406 may determine whether the connection is admissible based on its current bandwidth use, the number of connections that DU 406 has with other UEs 102, etc. If determined to be admissible, DU 406 would allow UE 102 to establish an RRC connection with DU 406 and register with core network 206. Otherwise, DU 406 would not allow UE 102 to establish the connection and register.

Process 600 may further include wireless station 208 or CU-CP 402/DU 406 determining whether the RAN component that handles the signals from UE 102 is an eNB (block 608). If the RAN component is an eNB (block 608: YES), process 600 may proceed to block 610.

At block 610, eNB 208-2 may apply LTE RAN partitioning. That is RAN components may operate as LTE components. Furthermore, eNB 208-2 and gNB 208-2 may schedule data to/from UE 102-1 or UE 102-2 based SPIDs and QCIs (block 612). For example, continuing with the preceding example associated with FIG. 7, assume that UE 102-1 establishes an RRC connection with eNB 208-2 and registers with core network 206 via eNB 208-2, MME 322, UDB 750, etc. After the registration, when eNB 208-2 receives a request to establish a session from UE 102-1, eNB 208-1 may obtain parameters of the request (e.g., an Access Point Name, an application ID, an International Mobile Subscriber Identity (IMSI), etc.) and forward a session modification message including the parameters to MME 322 over path 704. MME 322 may consult UDB 750 for subscriber information as needed, select a SGW 324 if needed, and signal the selected SGW 324 via path 706, relaying any of the information needed to establish an anchor point for the UE session. SGW 324 may then signal PGW 326 over path 708, to have PGW 326 provide the anchor point.

Assuming that the anchor point setup is successful, MME 322 may then send a reply to eNB 208-2, providing information that MME 322 obtained from UE 102-1, such as Service Profile Identifier (SPID). When eNB 208-2 receives the information from MME 322, eNB 208-2 may map the SPID to a QCI (Quality-of-Service (QoS) Class Identifier). In addition, eNB 208-2 may assign the radio bearer for UE 102-1 to a flow associated with the anchor point at PGW 326. Thereafter, when eNB 208-2 receives data for UE 102-1 from the anchor point, eNB 208-2 may schedule the data for transmission to UE 102-1, in accordance with the QCI. For example, if eNB 208-2 has connections to multiple UEs 102 and each UE 102 has established a session, eNB 208-2 may receive many streams of data from different anchor points for UEs 102. eNB 208-2 may schedule data from different flows/streams in accordance with the QCIs associated with each flow/stream, for transmission to the UEs 102.

Returning to block 608, if the RAN component is not eNB 208-2 (block 608: NO), process 600 may proceed to block 614. At block 614, gNB 208-1 (since the device has determined that it is not an eNB, it has to be a gNB) may apply 5G RAN partitioning. That is RAN components operate as 5G RAN components. Furthermore, DU 406 may schedule data to/from UE 102 based on S-NSSAIs, SPIDs, and 5QIs (block 616). For example, continuing with the preceding example associated with FIG. 8, assume that UE 102 establishes an RRC connection with DU 406 and registers with core network 206 via DU 406, CU-CP 402, AMF 302, UDB 850, etc. After the registration, when DU 406 receives a request to establish a session from UE 102, DU 406 may obtain parameters of the request (e.g., an S-NSSAI, an application ID, an IMSI, an External ID, an identifier for the data radio bearer (DRB ID), etc.) and forward a UE context message including the parameters to CU-CP 402 over path 804. CU-CP 402 may then send a session modification request including some or all of the parameters to AMF 302 (path 806).

When AMF 302 receives the request for session from CU-CP 402, in response, AMF 302 may request, over path 808, SMF 304 to create or modify a session. Upon receipt of the message, SMF 304 may select a UPF 306 based on information about the endpoint with which UE 102 is to establish the session. SMF 304 may exchange signals with UPF 306 over path 810 to set an anchor point at UPF 306. SMF 304 then messages AMF 302 about the anchor point and UPF 306 over path 808.

After AMF 302 receives the message from SMF 304, AMF 302 may inform CU-CP 402 over path 806, that the anchor point is established. Depending on the implementation, CU-CP 402 may then select CU-UP 404 based on a list of available CU-CPs 404. For example, CU-CP 402 may select the CU-UP 404 that is able to handle the required bandwidth for UE 102. In other implementations, a default CU-UP 404-1 that is associated with the UPF 306 may be selected. After selecting CU-UP 404, CU-CP 402 may send a bearer context message over path 812 so that the selected CU-UP 404 can map the DRB at DU 406 to a particular flow path 816. Once the mapping is complete, the requested session can be established from UE 102 to the endpoint via UPF 306. Thereafter, CU-UP 404 can receive session data from DU 406 over path 814 (F1-U) and forward the data to UPF 306, over path 816. CU-UP 404 may also forward session data received from UPF 306 to DU 406. DU 406 may forward any uplink data to CU-UP 404 and downlink data to UE 102.

In addition to configuring CU-UP 304, CU-CP 302 may provide information to DU 406 so that DU 406 can schedule data to and from UE 102. For example, CU-CP 302 may provide the SPID and/or 5QI to DU 406. DU 406 may then use the SPID, S-NSSAI, and/or 5QI to schedule data for transmission to UE 102.

FIG. 9A illustrates example table of SPIDs for an NSA 5G RAN according to an implementation. With reference to FIG. 7, as described above, when eNB 208-1 receives information about UE 102-2 or gNB 208-1 obtains information about UE 102-1, eNB 208-2 or gNB 208-1 may receive a SPID. eNB 208-2 or gNB 208-1 may use the SPID to determine a corresponding QCI. Table 900 shows one possible mapping between different SPIDs and QCIs. For example, SPID_MEC, SPID_FWA, and SPID_EMBB may correspond to QCI_A, QCI_B, and QCI_C. SPID_MEC, SPID_FWA, and SPID_EMBB are service profile identifiers for services related to a MEC, a fixed wireless access point, and an enhanced mobile broadband service. QCI_A, QCI_B, and QCI_C may correspond to different quality of service based on latencies (e.g., latency <30 milliseconds).

Figure 9B:
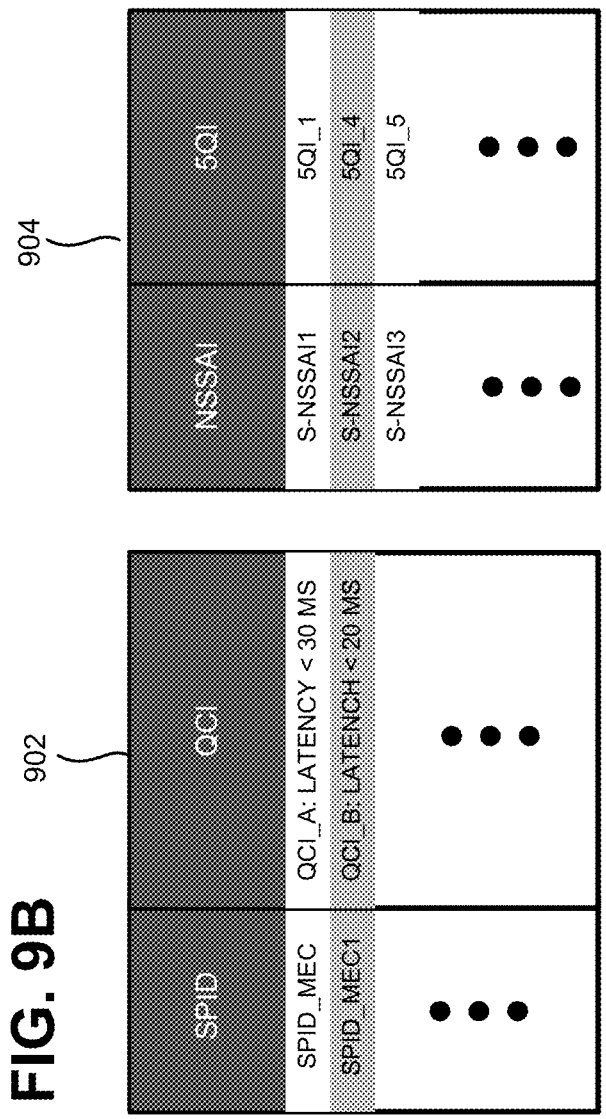
FIG. 9B illustrates example table of SPIDs and single-Network Slice Selection Assistance Information (NSSAIs) for an SA 5G RAN according to an implementation.

FIG. 9B illustrates example tables of SPIDs and single-Network Slice Selection Assistance Information (NSSAIs) for a 5G NR network according to an implementation. With reference to FIG. 8, as described above, when DU 406 receives information about UE 102 for scheduling, DU 406 may receive a SPID and/or S-NSSAI associated with UE 102. DU 406 may use the SPID or S-NSSAI to determine a corresponding QCI or 5QI. In one implementation, DU 406 may use the mapping shown by tables 904 and 906 to determine its own 5QI.

Table 902 shows one possible mapping between different SPIDs and QCIs for an SA network. For example, SPID MEC and SPID MEC1 may correspond to QCI_A (latency <30 milliseconds) and QCI_B (latency <20 milliseconds). Table 904 shows one possible mapping between different S-NSSAIs and 5QIs for an SA network. For example, S-NSSAI1, S-NSSAI2, and S-NSSAI3 may correspond to 5QI_1 (latency <30 milliseconds), 5QI_4 (latency <20 milliseconds), and 5QI_5 (latency <10 milliseconds).

Figure 10:
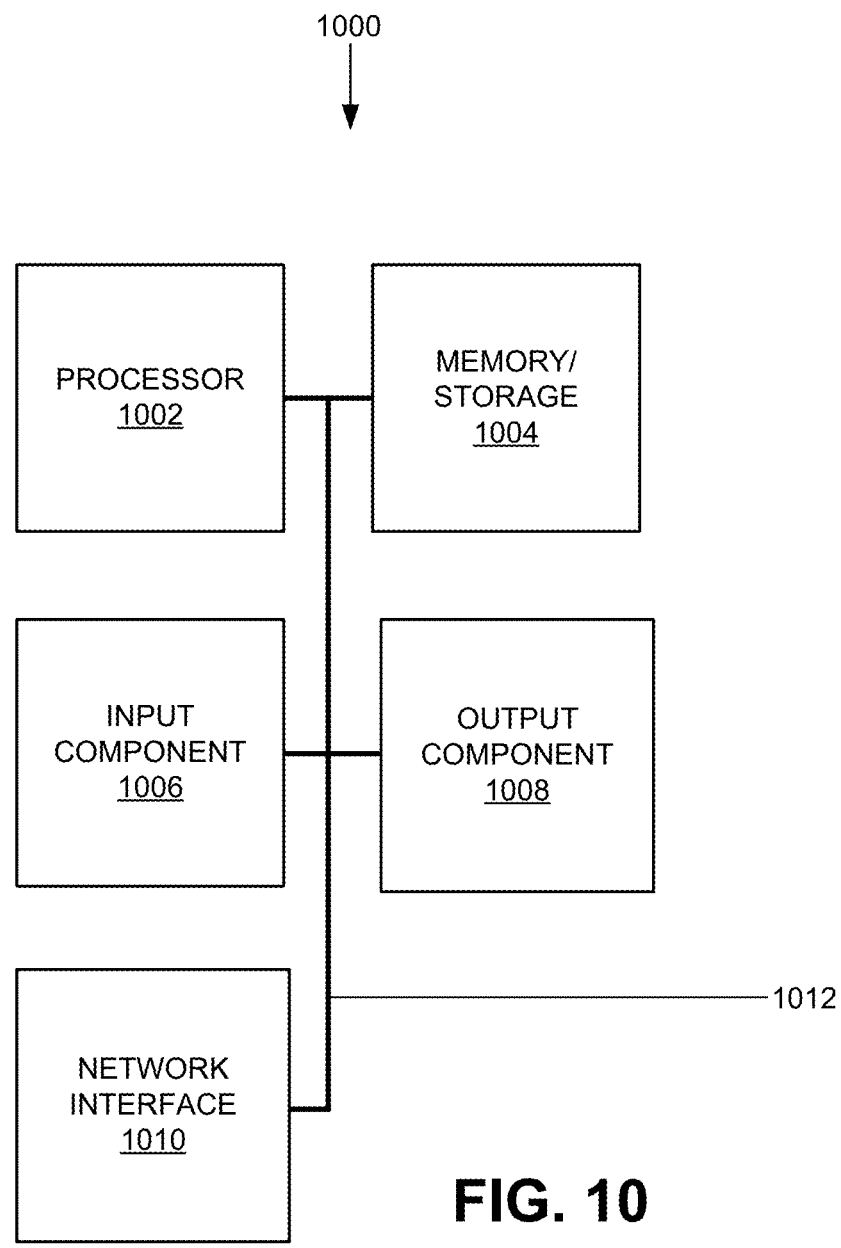
FIG. 10 depicts components of an example network device, according to an implementation.

FIG. 10 depicts example components of an example network device 1000. Network device 1000 corresponds to or is included in UE 102, IAB nodes 210, and any of the network components of FIGS. 1-5, 7, and 8 (e.g., a router, a network switch, servers, gateways, gNB 208-1, eNB 208-2, MEC cluster 212, AMF 302, SFM 304, UPF 306, PCF 308, UDM 310, UDR 312, MME 322, SGW 324, PGW 326, PCRF 328, HSS 330, CU-CP 402, CU-UP 404, DU 406, etc.). As shown, network device 1000 includes a processor 1002, memory/storage 1004, input component 1006, output component 1008, network interface 1010, and communication path 1012. In different implementations, network device 1000 may include additional, fewer, different, or a different arrangement of components than the ones illustrated in FIG. 10. For example, network device 1000 may include a display, network card, etc.

Processor 1002 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 1000 and/or executing programs/instructions.

Memory/storage 1004 may include static memory, such as read only memory (ROM), and/or dynamic memory, such as random access memory (RAM), or onboard cache, for storing data and machine-readable instructions (e.g., programs, scripts, etc.).

Memory/storage 1004 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 1004 may be external to and/or removable from network device 1000. Memory/storage 1004 may include, for example, a Universal Serial Bus (USB) memory stick, a dongle, a hard disk, off-line storage, a Blu-Ray® disk (BD), etc. Memory/storage 1004 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 1006 and output component 1008 may provide input and output from/to a user to/from network device 1000. Input and output components 1006 and 1008 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 1000.

Network interface 1010 may include a transceiver (e.g., a transmitter and a receiver) for network device 1000 to communicate with other devices and/or systems. For example, via network interface 1010, network device 1000 may communicate with wireless station 208.

Network interface 1010 may include an Ethernet interface to a LAN, and/or an interface/connection for connecting network device 1000 to other devices (e.g., a Bluetooth interface). For example, network interface 1010 may include a wireless modem for modulation and demodulation.

Communication path 1012 may enable components of network device 1000 to communicate with one another.

Network device 1000 may perform the operations described herein in response to processor 1002 executing software instructions stored in a non-transient computer-readable medium, such as memory/storage 1004. The software instructions may be read into memory/storage 1004 from another computer-readable medium or from another device via network interface 1010. The software instructions stored in memory or storage (e.g., memory/storage 1004, when executed by processor 1002, may cause processor 1002 to perform processes that are described herein. For example, UE 102, AMF 302, SMF 304, UPF 306, wireless station/IAB donor 208, IAB nodes 210, CU-CP 402, CU-UP

404, and DU 406 may each include various programs for performing some of the above-described functions and processes.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks have been described above with regard to the process illustrated in FIG. 6, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A component comprising:
    a processor configured to:
        receive information from a unified database, wherein the information includes a Service Profile Identifier (SPID);
        select a Quality-of-Service (QoS)-related identifier (ID) at least based on the SPID;
        either map a radio bearer to a flow associated with a User Equipment device (UE) or configure a second component to map the radio bearer to the flow; and
        after the processor maps the radio bearer to the flow, send data from the flow to the UE based on the QoS related ID; or
        after the second component is configured, forward the SPID to a third component that sends the data from the flow to the UE based on the QoS-related ID.

2. The component of claim 1, wherein the component includes one of an evolved Node B (eNB) or a Central Unit-Control Plane (CU-CP).

3. The component of claim 1, wherein the second component includes a Central Unit-User Plane (CU-CP) and the third component includes a Distributed Unit (DU).

4. The component of claim 1, wherein the QoS-related ID includes:
    a QoS Class ID (QCI) or a Fifth Generation QoS ID (5QI).

5. The component of claim 1, wherein one of the processor or the third component is further configured to:
    apply access control and call admission control.

6. The component of claim 5, wherein when one of the processor or the third component applies access control, one of the processor or the third component is configured to:
    broadcast access bailing information to UEs.

7. The component of claim 1, wherein when the processor selects the QoS-related ID, the processor selects the QoS-related ID based on the SPID and a Single-Network Slice Selection Assistance Information (S-NSSAI).

8. The component of claim 1, wherein when the processor sends the data from the flow to the UE based on the QoS-related ID, the processor is configured to:
    schedule the data for transmission based on the QoS-related ID; and
    transmit the data to the UE in accordance with the scheduling.

9. The component of claim 1, wherein the third component includes one or more Integrated Access and Backhaul (IAB) nodes.

10. The component of claim 1, wherein the unified database includes one of:
    a Home Subscriber Server or a Unified Data Management (UDM).

11. A method comprising:
    receiving information from a unified database, wherein the information includes a Service Profile Identifier (SPID);
    selecting a Quality-of-Service (QoS)-related identifier (ID) at least based on the SPID;
    either mapping a radio hearer to a flow associated with a User Equipment device (UE) or configuring a component to map the radio bearer to the flow; and
    after mapping the radio bearer to the flow, sending data from the flow to the UE based on the QoS related ID; or
    after configuring the second component, forwarding the SPID to a second component for sending the data from the flow to the UE based on the QoS-related ID.

12. The method of claim 11, wherein receiving includes:
    receiving, at either an evolved Node B (e B) or a Central Unit-Control Plane (CU-CP), the information from the unified database.

13. The method of claim 11, wherein the component includes a Central Unit-User Plane (CU-CP) and the second component includes a Distributed Unit (DU).

14. The method of claim 11, wherein the OoS-related ID includes: a QoS Class ID (QCI) or a Fifth Generation QoS ID (5QI).

15. The method of claim 11, further comprising:
    applying access control and call admission control.

16. The method of claim 15, wherein applying access control includes:
    broadcasting access barring information to UEs.

17. The method of claim 11, wherein selecting the QoS-related ID includes:
selecting the QoS-related ID based on the SPID and a Single-Network Slice Selection Assistance Information (S-NSSAI).

18. The method of claim 11, wherein sending the data from the flow to the UE based on the QoS-related ID includes:
scheduling the data based on the QoS-related ID; and
transmitting the data to the UE.

19. A non-transitory computer-readable medium comprising processor-executable instructions wherein when executed by a processor, the instructions cause the processor to:
receive information from a unified database, wherein the information includes a Service Profile Identifier (SPID);
select a Quality-of-Service (QoS)-related identifier (ID) at least based on the SPIT);
either map a radio bearer to a flow associated with a User Equipment device (UE) or configure a component to map the radio bearer to the flow;
after mapping the radio bearer to the flow, send data from the flow to the UE based on the QoS related ID; or
after configuring the second component, forward the SPID to a second component for sending the data from the flow to the UE based on the QoS-related ID.

20. The non-transitory computer readable medium of claim 19, wherein the second component includes one or more Integrated Access and Backhaul (IAB) nodes.

* * * * *